United States Patent
Maeda et al.

(10) Patent No.: US 7,662,218 B2
(45) Date of Patent: Feb. 16, 2010

(54) FILTER FOR PURIFYING HYDROGEN AND METHOD FOR MANUFACTURE THEREOF

(75) Inventors: Takanori Maeda, Shinjuku-ku (JP); Hiroshi Yagi, Shinjuku-ku (JP); Asako Harayama, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 505 days.

(21) Appl. No.: 10/589,970

(22) PCT Filed: Oct. 18, 2005

(86) PCT No.: PCT/JP2005/019462

§ 371 (c)(1),
(2), (4) Date: Aug. 18, 2006

(87) PCT Pub. No.: WO2006/043696

PCT Pub. Date: Apr. 27, 2006

(65) Prior Publication Data

US 2007/0190302 A1 Aug. 16, 2007

(30) Foreign Application Priority Data

Oct. 20, 2004 (JP) .............................. 2004-305659

(51) Int. Cl.
*B01D 53/22* (2006.01)
*B01D 71/02* (2006.01)

(52) U.S. Cl. .................... 96/4; 96/11; 95/55; 95/56; 55/523; 55/524; 55/DIG. 5; 216/17; 216/41; 216/56; 205/265; 205/291

(58) Field of Classification Search .................... 95/55, 95/56; 96/4, 11; 55/523, 524, DIG. 5; 216/17, 216/41, 56; 205/265, 291
See application file for complete search history.

(56) References Cited

U.S. PATENT DOCUMENTS

| 6,066,592 A | * | 5/2000 | Kawae et al. .................. 95/56 |
| 7,033,641 B2 | * | 4/2006 | Saijo et al. ..................... 95/56 |
| 7,144,444 B2 | * | 12/2006 | Takatani et al. ................ 95/56 |

(Continued)

FOREIGN PATENT DOCUMENTS

JP          5 76738          3/1993

(Continued)

*Primary Examiner*—Jason M Greene
(74) *Attorney, Agent, or Firm*—Oblon, Spivak, McClelland, Maier & Neustadt, L.L.P.

(57) ABSTRACT

A hydrogen-purification membrane comprises a Pd alloy film joined to one surface of a porous support substrate. Each pore in the porous support substrate is such that between the thickness T of the porous support substrate, the opening diameter D1 of the pore on the side joined to the Pd alloy film and the opening diameter D2 of the pore on the opposite side, there are relations represented by $1.0 \leq D1/T \leq 5.0$ and $1.0 \leq D2/T \leq 5.0$, and between the opening diameter D1 of the pore on the side joined to the Pd alloy film, the opening diameter D2 of the pore on the opposite side and the opening diameter D3 of the narrowest portion of the pore there are relations represented by $D3/D1<0.8$, $D3/D2<0.9$ and $D3<250$ μm. Furthermore, the total opening area of the pores on the side joined to the Pd alloy film accounts for 20 to 80% of the area of the porous support substrate.

16 Claims, 7 Drawing Sheets

U.S. PATENT DOCUMENTS 7,282,148 B2 * 10/2007 Dalton et al. .................. 96/4
2004/0245191 A1 * 12/2004 Yagi et al. .................. 210/791

FOREIGN PATENT DOCUMENTS

| JP | 5-76738 | * | 3/1993 |
| JP | 2004-57993 | * | 2/2004 |
| JP | 2004 57993 | | 2/2004 |

* cited by examiner

FILTER FOR PURIFYING HYDROGEN AND METHOD FOR MANUFACTURE THEREOF

TECHNICAL FIELD

The present invention relates generally to a hydrogen-purification membrane and its fabrication process, and more particularly to a hydrogen-purification membrane used with a reformer or other device for reforming a variety of hydrocarbon fuels by steam reforming to generate hydrogen-rich gas, and a process capable of facilitating its fabrication.

BACKGROUND ART

Recently with global environments as well as energies and resources, problems have come to the surface, and fuel cells now attract attention as one of energy supply systems for putting them in harmony with the industry. A fuel cell is a power generator wherein hydrogen-rich gas obtained by reformation of previously supplied hydrogen gas, or hydrocarbonaceous fuels such as natural gas, gasoline, butane gas and methanol is allowed to react electrochemically with atmospheric oxygen for giving direct access to electricity. A typical fuel cell using the hydrogen-rich gas comprises a reformer for steam reformation of hydrocarbonaceous fuel to generate hydrogen-rich gas, a fuel cell unit for generation of electricity, a converter for conversion of the resulting DC current into an AC current, etc.

Depending on the electrolyte used with the fuel cell unit, the reaction forms involved, etc., such a fuel cell is generally broken down into five types: a phosphoric acid type fuel cell (PAFC), a molten carbonate type fuel cell (MCFC), a solid electrolyte type fuel cell (SOFC), an alkali type fuel cell (AFC) and a solid polymer type fuel cell (PEFC). Of these, the solid polymer type fuel cell (PEFC), because of using a solid electrolyte, is conditionally more favorable than other fuel cells such as the phosphoric acid type fuel cell (PAFC), and the alkali type fuel cell (AFC).

Problems with the solid polymer type fuel cell (PEFC) are, however, that its electrode catalyst is poisoned by a slight amount of CO and its performance becomes much worse especially in high current density regions, because platinum is used as the catalyst and because of low operation temperature. This requires for the concentration of CO contained in the reformed gas (hydrogen-enriched gas) generated in the reformer to go down to about 10 ppm.

A hydrogen-purification membrane comprising a Pd alloy film has been developed as one of means for removing CO from the reformed gas to refine hydrogen. In principal, the Pd alloy film would be permeable to hydrogen alone, if it gets rid of pinholes, cracks or the like. Specifically, if the reformed gas side is placed at high temperature and pressure (for instance, 300° C. and 3 to 10 kg/cm$^2$ (0.29 to 0.98 MPa)), hydrogen would pass to a low partial pressure-of-hydrogen side.

For a hydrogen-purification process using such a Pd alloy film as described above, the film must be thin because the rate of permeation of hydrogen is inversely proportional to film thickness. In view of mechanical strength, however, the Pd alloy film is only allowed to have a thickness of about 30 μm at most when used alone; when a Pd alloy film having a thickness of about a dozen or so μm is used, a support of porous structure has so far been placed on the low partial pressure-of-hydrogen side of the Pd alloy film. However, the Pd alloy film and the support must be separately attached to the reformer, giving rise to a problem in connection to the workability for obtaining good sealing, and a problem that friction occurs between the Pd alloy film and the support, rendering the durability of the Pd alloy film less than satisfactory.

To obviate the above problems, there has been developed a hydrogen-purification membrane wherein a Pd alloy film is formed directly on a support into an integrated Pd alloy film/support combination. For instance, there is available a hydrogen-purification membrane of the structure wherein a Pd alloy film is formed on one surface of a flat metal sheet, through-holes are then formed by etching through the flat metal sheet from its opposite surface, and a porous support substrate is finally applied onto the Pd alloy film to hold the Pd alloy film between them (JP(A)7-124453). There is also available a hydrogen-purification membrane fabricated by forming a Pd alloy film on a temporary support, then forming a resist pattern on the Pd alloy film, then forming a metal base film having micro-openings by electrolytic plating in such a way as to cover 30 to 95% of the Pd alloy film, and finally removing the temporary support (JP(A)2002-292259). Further, there is a hydrogen-purification membrane fabricated by placing a metal sheet on one surface of an electrically conductive substrate having through-holes, then copper plating another surface of the conductive substrate to form a copper plating layer in such a way as to fill in the through-holes, then removing the metal layer to form a Pd alloy film on the resulting surface, and finally removing the copper plating layer by selective etching (JP(A)2004-57866).

With the hydrogen-purification membrane set forth in JP(A)2004-57866, however, yields are low with difficulty in cutting down on fabrication costs, because upon the resist formation and the etching at the step of providing through-holes by etching of the flat metal sheet with the Pd alloy film formed on one surface from its back surface side, the Pd alloy film is susceptible to break down. Further, etching from one side of the flat metal sheet causes the opening diameter of each through-hole to become inevitably larger than the thickness of the flat metal sheet and the through-hole pitch to become wide, imposing limitations on the number of through-holes formed per unit area. To add to this, one-side etching of the flat metal sheet from its back surface side causes the opening diameter of each through-hole to become small on the Pd alloy film side and, hence, the area of the Pd alloy film contributing to the permeation of hydrogen to become small, eventuating in a drop of the hydrogen permeation efficiency of the membrane.

A problem with the hydrogen-purification membrane set forth in JP(A)2002-292259, on the other hand, is that much time is taken to form the metal base film on the Pd alloy film by electrolytic plating, and it is difficult to form a metal base film having sufficient strength and large thickness. There is another problem that the resist is likely to remain on micro-openings in the formed metal base film.

With the hydrogen-purification membrane disclosed in JP(A)2004-57866, voids not plated with copper often occur at the copper plating layer, especially at a deep site of each through-hole (the site to be later formed with the Pd alloy film) at the step of filling in the through-holes by copper plating. Such voids would otherwise be responsible for pinhole defects of the Pd alloy film. This causes a complex process control and offers obstacles to cutting down on fabrication costs.

DISCLOSURE OF THE INVENTION

The invention has for its object the provision of a hydrogen-purification membrane capable of refining hydrogen with more improved hydrogen permeation efficiency than ever before and a process capable of facilitating its fabrication.

According to one aspect of the invention, this object is achieved by the provision of a hydrogen-purification membrane, comprising a porous support substrate having a plurality of pores and a Pd alloy film joined to one surface of said porous support substrate, wherein:

each pore in said porous support substrate is configured to have a narrowest portion therein, between the thickness T of said porous support substrate, the opening diameter D1 of each pore on a side joined to said Pd alloy film and the opening diameter D2 of the pore on an opposite side, there are relations represented by $1.0 \leq D1/T \leq 5.0$ and $1.0 \leq D2/T \leq 5.0$, between the opening diameter D1 of the pore on the side joined to said Pd alloy film, the opening diameter D2 of the pore on the opposite side and the opening diameter D3 of the narrowest portion of the pore, there are relations represented by $D3/D1<0.8$, $D3/D2<0.9$ and $D3<250$ μm, and the total opening area of the pores on the side joined to said Pd alloy film accounts for 20 to 80% of an area of said porous support substrate.

In one embodiment of this aspect of the invention, the porous support substrate has a thickness ranging from 20 to 500 μm, and the Pd alloy film has a thickness ranging from 0.5 to 30 μm.

According to another aspect of the invention, there is provided a hydrogen-purification membrane, comprising a porous support substrate having a plurality of pores and a Pd alloy film joined to one surface of said porous support substrate, wherein:

between the thickness T of said porous support substrate, the opening diameter D1 of each pore on a side joined to said Pd alloy film and the opening diameter D2 of the pore on an opposite side, there are relations represented by $1.5 \leq D1/T \leq 5.0$ and $0.2 \leq D2/D1 \leq 0.8$, and the total opening area of the pores on the side joined to said Pd alloy film accounts for 30 to 90% of an area of said porous support substrate.

In one embodiment of the second aspect of the invention, the porous support substrate has a thickness ranging from 20 to 500 μm, and the Pd alloy film has a thickness ranging from 0.5 to 30 μm.

According to yet another aspect of the invention, there is provided a hydrogen-purification membrane fabrication process, comprising:

a resist-formation step of forming a resist pattern having a plurality of openings on the front surface of an electrically conductive support substrate, and forming on the back surface of said support substrate a resist pattern having a plurality of openings in alignment with the openings in the first resist pattern, an etching step of etching said support substrate from its front and back sides using said resist patterns as masks to make a porous support substrate having a plurality of pores, wherein each pore has a narrowest portion therein; $1.0 \leq D1/T \leq 5.0$ and $1.0 \leq D2/T \leq 5.0$ are satisfied with respect to the relations of the opening diameter D1 of the pore on the front surface side and the opening diameter D2 of the pore on the back surface side to the thickness T of said support substrate; $D3/D1<0.8$, $D3/D2<0.9$ and $D3<250$ μm are satisfied with respect to the relations of the opening diameter D3 of said narrowest portion to said opening diameters D1 and D2; and the total area of the openings on the front surface side accounts for 20 to 80% of the area of said porous support substrate, a filling step of applying an insulating film onto the back surface side of said support substrate, and forming a plating layer on said porous support substrate from the front surface side thereof by electrolytic plating in such a way as to fill in said pores, a film-formation step of removing said insulating film, polishing said plating layer in such a way as to expose the front surface of said porous support substrate, and forming a Pd alloy film on the thus polished surface side by plating, and a removal step of removing said plating layer and said electrically conductive undercoat layer from the back surface side of said porous support substrate by means of selective etching.

According to a further aspect of the invention, there is provided a hydrogen-purification membrane fabrication process, comprising:

a resist-formation step of forming a resist pattern having a plurality of openings on the front surface of an electrically conductive support substrate, and forming on the back surface of said support substrate a resist pattern having a plurality of smaller openings in alignment with the openings in the first resist pattern and with a smaller area than that of the first openings or having no such smaller openings, an etching step of etching said support substrate from the front and back surfaces or the front surface thereof using said resist patterns as masks to make a porous support substrate having a plurality of pores wherein $1.5 \leq D1/T \leq 5.0$ and $0.2 \leq D2/D1 \leq 0.8$ are satisfied with respect to the relations of the opening diameter D1 on the front surface side and the opening diameter D2 on the back surface side to the thickness T of said support substrate; and the total area of the openings on the front surface side accounts for 20 to 80% of the area of said porous support substrate, a filling step of applying an insulating film onto the back surface side of said support substrate, and forming a plating layer on said porous support substrate from the front surface side thereof by electrolytic plating in such a way as to fill in said pores, a film-formation step of removing said insulating film, polishing said plating layer in such a way as to expose the front surface of said porous support substrate, and forming a Pd alloy film on the thus polished surface side by plating, and a removal step of removing said plating layer and said electrically conductive undercoat layer from the back surface side of said porous support substrate by means of selective etching.

In one embodiment of the third or fourth aspect of the invention, at said film-formation step, the Pd alloy film is formed by electrolytic plating, or at said film-formation step, thin films of individual components that form the Pd alloy film are first stacked by plating, and heat treatment is then applied to the stack to form the Pd alloy film by component diffusion.

In another embodiment of the third or fourth aspect of the invention, at said film-formation step, a strike plating layer is formed on said polished surface side, and the Pd alloy film is then formed, while said strike plating layer is removed by selective etching at said removal step.

In yet another embodiment of the third or fourth aspect of the invention, at said film-formation step, a strike plating layer is formed on said polished surface side, and the Pd alloy film is then formed, while heat treatment is applied to said strike plating layer for component diffusion into the Pd alloy film.

In further embodiment of the third or fourth aspect of the invention, at said film-formation step, a diffusion-preventive layer is formed on said polished surface side by electrolytic plating or electroless plating, and the Pd alloy film is then formed, while said diffusion-preventive layer is removed by selective etching at said removal step.

The inventive hydrogen-purification membrane as described above, because there are the narrowest portions in the pores of its porous support substrate, can have enhanced membrane performance and, at the same time, enables the pores in the porous support substrate to be at such a decreased pitch as needed in high-durability hydrogen-purification membranes. Although the effective hydrogen permeation area available in each pore is relatively small, the whole membrane is allowed to have a lot more pores per unit area, thereby having a much larger effective hydrogen permeation area. Thus, the membrane of the invention can be used especially as hydrogen-purification membranes for high-pressure purposes (for instance, a pressure of 0.40 MPa or higher) with ever higher durability and much improved hydrogen permeation efficient. The hydrogen-purification membrane of the invention wherein the opening area of each pore in the porous support substrate on the side joined to the Pd alloy film is larger than that on the opposite side can have a higher opening ratio so that the effective hydrogen permeation area of the Pd alloy film can be larger. Thus, this membrane can be used especially as a hydrogen-purification membrane for low-pressure purposes (for instance, a pressure of 0.40 MPa or lower) with ever higher durability and much improved hydrogen permeation efficiency.

According to the fabrication process of the invention wherein the pores have already be formed in the support substrate prior to the formation of the Pd alloy film on it, the Pd alloy film is unlikely to break down and the formation of any porous metal film on the Pd alloy film is dispensed with, and so the fabrication time can be cut down with no need of providing an additional resist removal step to the final step, resulting in improvements in fabrication efficiency. Further, because the pores having the narrowest portions and having the desired pore size range are formed at the etching step or the pores having the desired size range and a larger opening area on the side, on which the Pd alloy film is formed at the later step, are formed at the etching step, and because the embedding of the pores by the plating layer formed at the filling step occurs from the surface on which the Pd alloy film is formed at the later film-formation step, voids are less likely to occur in the plating layer embedded in the pores. Voids, if any, will occur on the back surface side with respect to the narrowest portions or deep in the pores, and such void sites will offer no obstacle to the formation of the Pd alloy film. Thus, high-quality hydrogen-purification membranes comprising a flawless Pd alloy film and having a large hydrogen permeation area can be fabricated in a stable manner.

BEST MODE FOR CARRYING OUT THE INVENTION

Some embodiments of the invention are now explained with reference to the drawings.

[Hydrogen-Purification Membrane]

Figure 1:
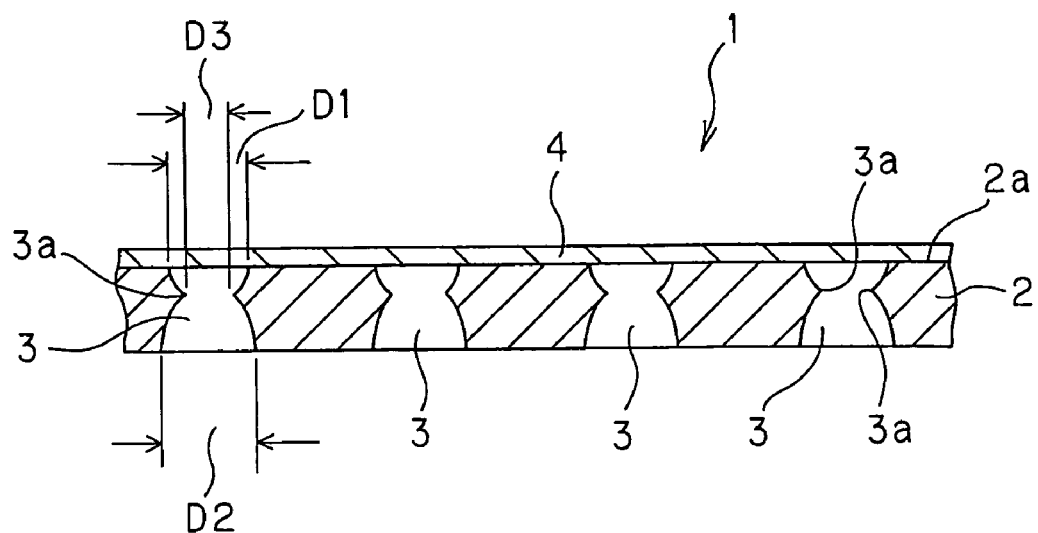
FIG. 1 is illustrative in partial section of one embodiment of the hydrogen-purification membrane according to the invention.

FIG. 1 is illustrative in partial section of one embodiment of the hydrogen-purification membrane according to the invention. Referring to FIG. 1, a hydrogen-purification membrane 1 comprises a porous support substrate 2 having a plurality of pores 3, and a Pd alloy film 4 joined to a surface 2a side of the porous support substrate 2. Each pore 3 is configured have a narrowest portion 3a inside.

With such a hydrogen-purification membrane 1, relations represented by $1.0 \leq D1/T \leq 5.0$ and $1.0 \leq D2/T \leq 5.0$ hold, where T is the thickness of the porous support-substrate 2, D1 is the opening diameter of each pore 3 on its side joined to the Pd alloy film 4, and D2 is the opening diameter of each pore 3 on the opposite side. Relations represented by $D3/D1<0.8$, $D3/D2<0.9$, preferably $D3/D2<0.8$, and $D3<250$ μm hold, too, where D1 is the opening diameter of each pore 3 on its side joined to the Pd alloy film 4, D2 is the opening diameter of each pore 3 on the opposite side, and D3 is the opening diameter of each pore 3 at the narrowest portion. Besides, the total opening area of the pores 3 on the side joined to the Pd alloy film accounts for 20 to 80%, preferably 20 to 70%, of the area of the porous support substrate 2.

It is herein understood that the opening diameters D1 and D2 of each pore 3 and the opening area ratio of the pores 3 on the side joined to the Pd alloy film 4 (the ratio of the total opening area of the pores 3 on the side joined to the Pd alloy film 4 to the area of the porous support substrate 2) have been calculated, using an image analyzer comprising an image pickup camera attached to a microscope. More specifically, an image of the porous support substrate 2 prior to the formation of the Pd alloy film 4 on it is taken through reflected light. Then, that image is converted into a binary image while the opening site of each pore (with no reflected light) is determined using given brightness as a threshold. On the basis of that binary image, D1, D2 and the opening area ratio are determined. The diameter D3 of each pore 3 at the narrowest portion 3a is likewise determined, using the above image analyzer. That is, the image of the porous support substrate 2 prior to the formation of the Pd alloy film 4 on it is taken through transmitted light this time. Then, that image is converted into a binary image while the opening site of each pore (with transmitted light passing through the narrowest portion alone) is determined using given brightness as a threshold. On the basis of that binary image, D3 is found out.

In calculating the opening area ratio of the pores 3, typically, the opening areas of ten pores are measured by counting the number of pixels at sites determined as openings using the above binary image, and the average of the opening areas is then obtained as an average opening area. Then, the opening area ratio is calculated relative to the area of the porous support substrate 2 on the basis of the pitch of the pores 3.

As is the case with the opening area, the opening diameters D1, D2 of each pore 3 and the opening diameter D3 of each pore 3 at the narrowest portion are determined by measuring the diameters of the opening sites of ten pores, and obtaining the average of them.

Figure 2:
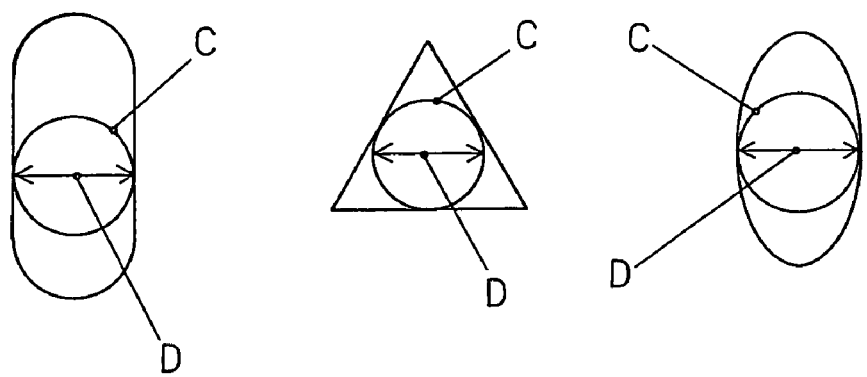
FIG. 2 is illustrative of the maximum inscribed circle for an opening.
Figure 3:
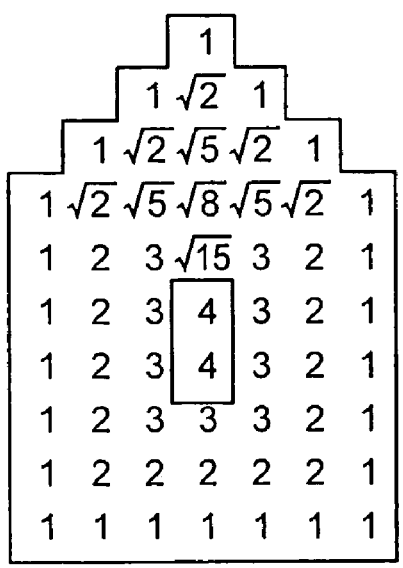
FIG. 3 is illustrative of one exemplary distance transformation for a binary image of an opening.

Referring here to how to measure the above diameter, when the opening of each pore is circular, the area of the opening site is measured from the above binary image, and the diameter is then calculated from a circle's diameter-to-area relation. When the opening of each pore is of elliptic, oval, polygonal or other shape, the diameter D of the maximum inscribed circle C for that pore is used as the opening diameter, as depicted in FIG. 2. Referring to how to find out the maximum inscribed circle C for an opening, that opening is first converted into a binary image. Distance transformation is then applied to that binary image to obtain pixels, from which numerical values indicative of a distance from the boundary (opening) of a figure are taken out. Then, the position of the pixel that provides the greatest value is assumed to be the center of the maximum inscribed circle. Finally, inscribed circles are drawn on center candidate coordinates suitably selected near that center (for instance, coordinates selected at equal micro-spaces) to find out the maximum inscribed circle. FIG. 3 is illustrative of the binary image to which distance transformation has been applied. Referring here to FIG. 3, center candidate coordinates is suitably selected near the position of the pixel that provides the greatest distance "4" from the boundary of the figure to draw inscribed circles thereon, from which the maximum inscribed circle is found out.

The opening diameter and area ratio of each pore in the explanation of other embodiments of the invention may also be found out in the manner described just above.

The relations holding between the thickness T of the porous support substrate 2 and the opening diameter D1, the opening diameter D2, the opening diameter D3, and the opening area ratio of the pores on the side joined to the Pd alloy film 4 are a requirement for obtaining a lot more pores per unit area while the opening diameter D1 of each pore 3 on the surface 2a side of the porous support substrate 2 (on the side joined to the Pd alloy film 4) is kept very small, thereby increasing the opening area ratio of the whole membrane and, at the same time, enhancing the mechanical strength of the porous support substrate 2. With the porous support substrate 2 capable of satisfying such a requirement, the area of the Pd alloy film 4 through which hydrogen permeates (the effective hydrogen permeation area) can be much more increased with ever higher hydrogen permeation efficiency while ensuring to hold the Pd alloy film 4 in place. Such an inventive hydrogen-purification membrane 1, especially when used as a high-pressure (for instance, 0.40 MPa or higher) hydrogen-purification membrane, could have much higher durability and much higher hydrogen permeation efficiency.

The porous support substrate 2 as mentioned above could be fabricated of austenite stainless- and ferrite stainless-based materials such as SUS304 and SUS430, and have a thickness suitably selected from the range of 20 to 500 μm, preferably 50 to 300 μm.

The Pd alloy film 4 that forms a part of the inventive hydrogen-purification membrane 1 has usually a Pd content of at least 60% by weight with one or more additive elements selected from Ag, Cu, Pt, Au, Ni, Co, V, Nb, Ta, Zr and so on. In view of improvements in the hydrogen permeation rate, such a Pd alloy film 4 should preferably be as thin as possible, and so could usually a thickness suitably selected from the range of 0.5 to 30 μm, preferably 1.0 to 15 μm.

Figure 4:
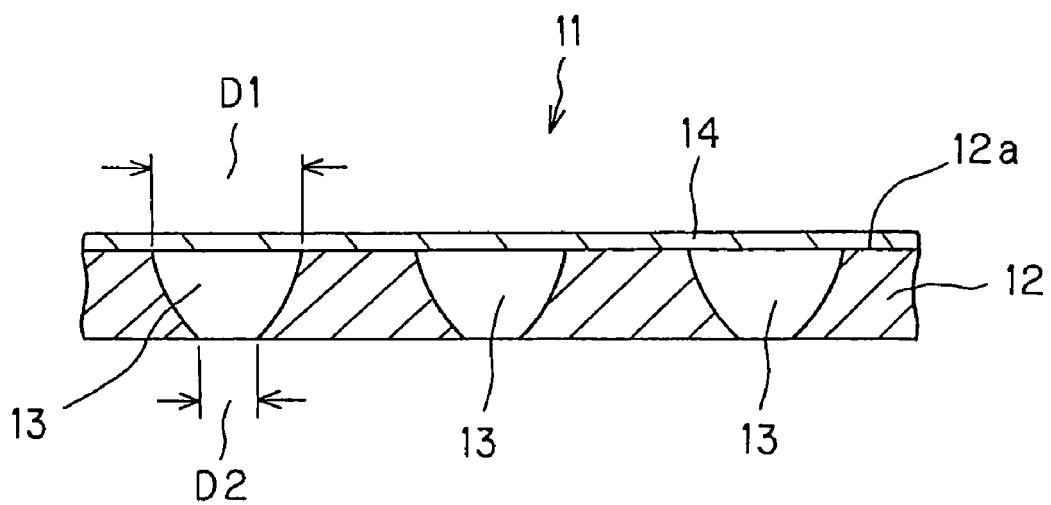
FIG. 4 is illustrative in partial section of another embodiment of the hydrogen-purification membrane according to the invention.

FIG. 4 is illustrative in partial section of another embodiment of the hydrogen-purification membrane according to the invention. Referring now to FIG. 4, a hydrogen-purification membrane shown generally at 11 comprises a porous support substrate 12 having a plurality of pores 13, and a Pd alloy film 14 joined to a surface 12a side of the porous support substrate 12.

With such a hydrogen-purification membrane 11, relations represented by $1.5 \leq D1/T \leq 5.0$ and $0.2 \leq D2/D1 \leq 0.8$, preferably $0.2 \leq D2/D1 \leq 0.7$ hold, where T is the thickness of the porous support substrate 12, D1 is the opening diameter of each pore 13 on the side joined to the Pd alloy film 14, and D2 is the opening diameter of the pore 13 on the opposite side. The total opening area of the pores 13 on the side joined to the Pd alloy film 14 accounts for 30 to 90%, preferably 30 to 80% of the area of the porous support substrate 12.

The relations holding between the thickness T of the porous support substrate 12 and the opening diameter D1, the opening diameter D2, and the opening area ratio of the pores on the side joined to the Pd alloy film 14 (the ratio of the total opening area of the pores 13 on the porous support substrate 12, as measured on the side joined to the Pd alloy film 14) are a requirement for increasing the opening ratio of the pores on the surface 12a side of the porous support substrate 12 and, at the same time, enhancing the mechanical strength of the porous support substrate 12. In the porous support substrate 12 capable of satisfying such a requirement, each pore 13 has a unique shape wherein the opening diameter on the surface 12a side (on the side joined to the Pd alloy film 14) is larger, and so the joining area of the porous support substrate 12 to the Pd alloy film 14 can be reduced to increase the opening ratio of the porous support substrate 12 to the Pd alloy film 14. This increases the area of the Pd alloy film 14 through which hydrogen is to permeate (the effective hydrogen permeation area) with an increase in the hydrogen permeation efficiency. However, even when the opening area S2 of each pore 13 is small on the back surface 12b side of the porous support substrate, hydrogen that has permeated through the Pd alloy film 14 can pass through the pore 13 with no difficulty. Conversely, such a small opening area S2 ensures that the porous support substrate 12 can have much higher mechanical strength. Such an inventive hydrogen-purification membrane 11, especially when used as a low-pressure (for instance, 0.40 MPa or lower) hydrogen-purification membrane, could have much higher durability and much higher hydrogen permeation efficiency.

The porous support substrate 12 that forms a part of the inventive hydrogen-purification membrane 11 may be fabricated of austenite stainless- and ferrite stainless-based materials such as SUS304 and SUS430, and have a thickness suitably selected from the range of 20 to 500 μm, preferably 50 to 300 μm.

The Pd alloy film 14 that forms a part of the inventive hydrogen-purification membrane 11 has usually a Pd content of at least 60% by weight with one or more additive elements selected from Ag, Cu, Pt, Au, Ni, Co, V, Nb, Ta, Zr and so on. In view of improvements in the hydrogen permeation rate, such a Pd alloy film 14 should preferably be as thin as possible, and so has usually a thickness suitably selected from the range of 0.5 to 30 μm, preferably 1.0 to 15 μm.

It is here noted that the above embodiments are provided by way of example alone; the opening shape, arrangement, etc. of the pores in the porous support substrate that forms a part of the inventive hydrogen-purification membrane are never ever limited thereto.

Although, in the embodiments described above, the Pd alloy film is joined directly to the porous support substrate, it is understood that the Pd alloy film may be joined to the porous support substrate via, for instance, a nickel strike plating layer, thereby making the joining strength of the porous support substrate and the Pd alloy film much higher. Alternatively, the Pd alloy film may be joined to the porous support substrate via a diffusion-preventive layer, thereby ensuring that even when placed under high-temperature conditions over a long period of time, the Pd alloy film can be improved in durability, because of no mutual diffusion of the porous support substrate and Pd.

[How to Fabricate the Hydrogen-Purification Membrane]

How to fabricate the inventive hydrogen-purification membrane is now explained.

Figure 5:
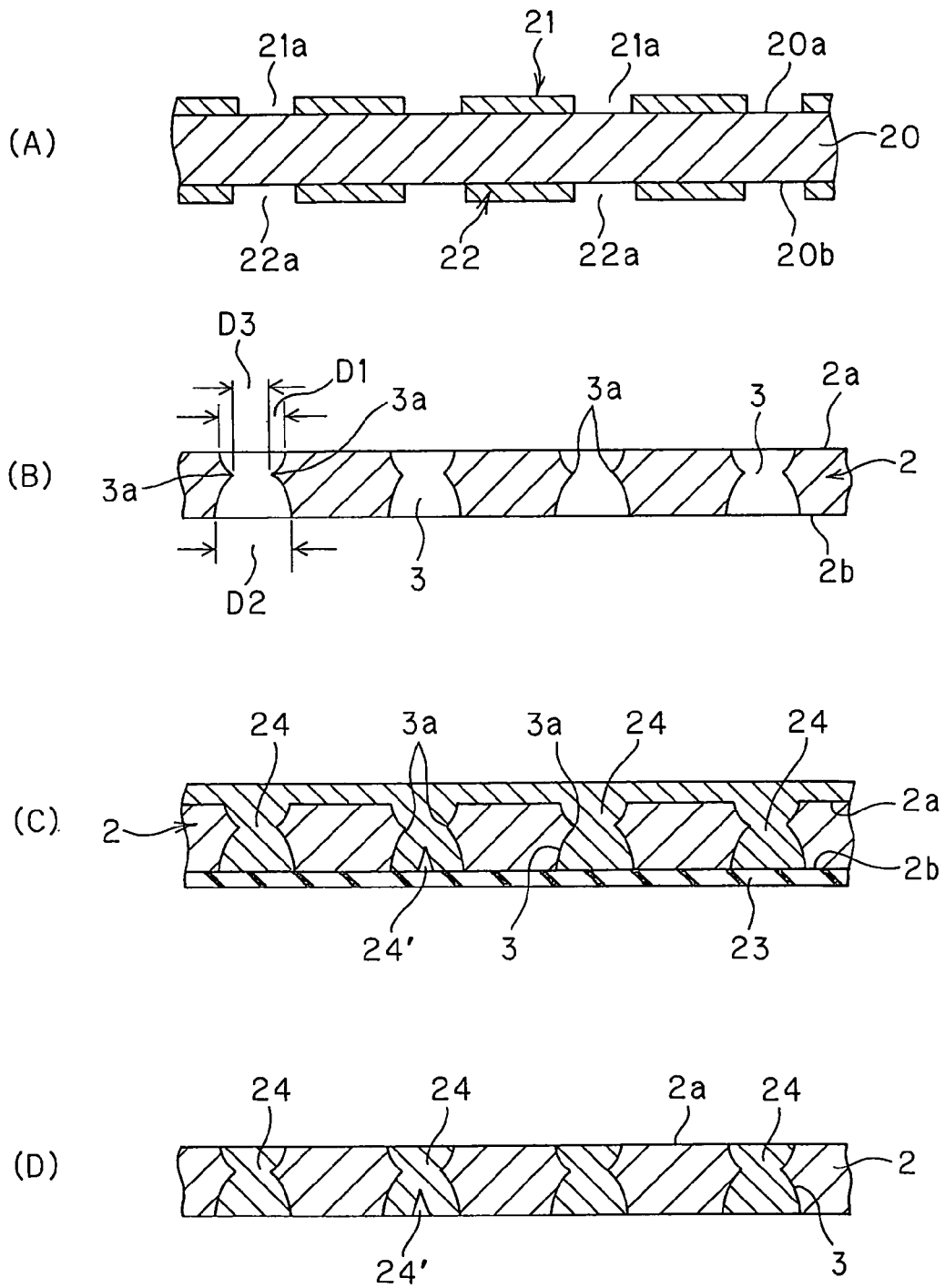
FIG. 5 is a step representation illustrative of one embodiment of the process of fabricating the hydrogen-purification membrane according to the invention.
Figure 6:
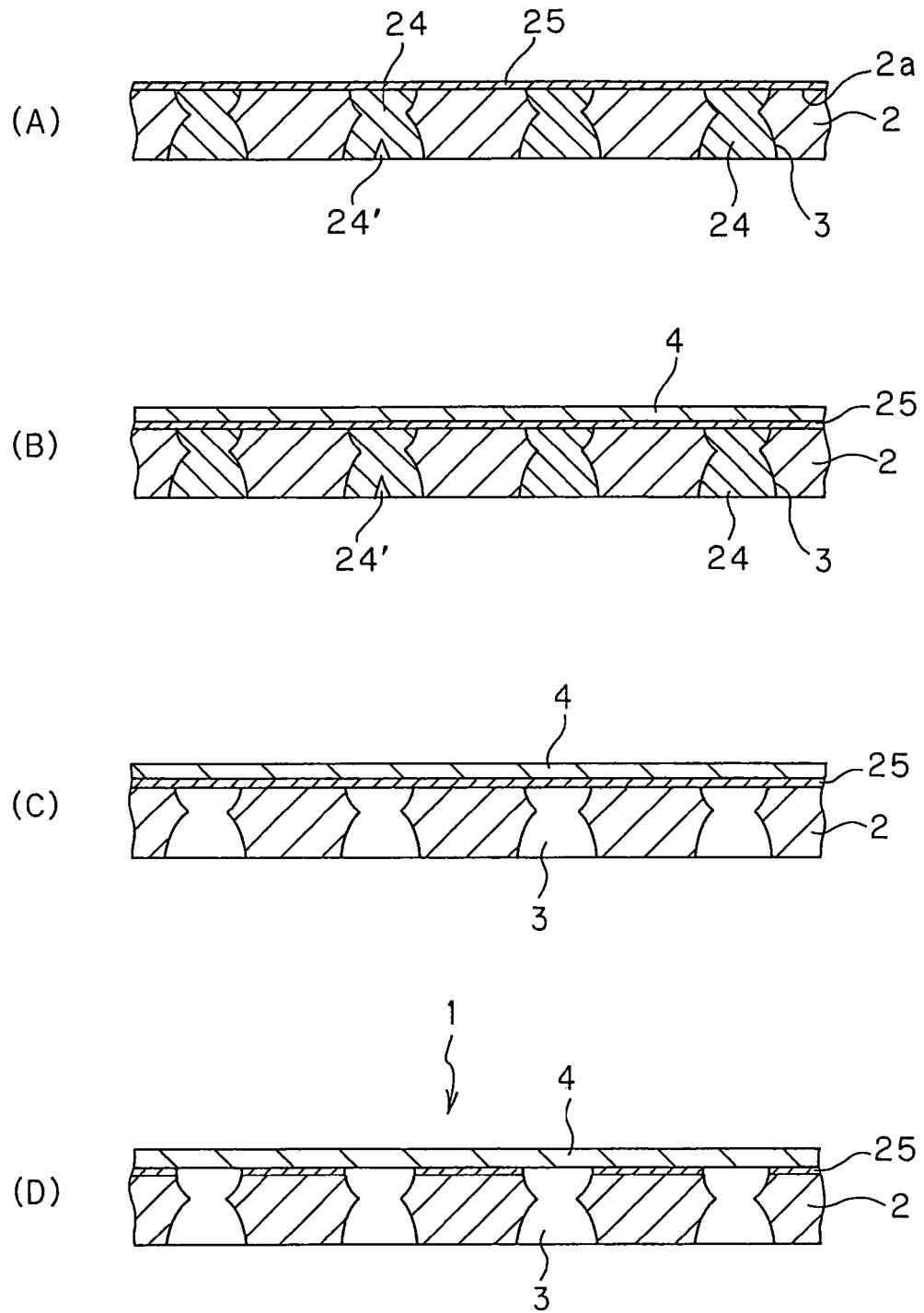
FIG. 6 is a step representation illustrative of one embodiment of the process of fabricating the hydrogen-purification membrane according to the invention.

FIGS. 5 and 6 are each illustrative of the steps of one embodiment of the hydrogen-purification membrane fabrication process according to the invention, wherein the above inventive hydrogen-purification membrane 1 is typically fabricated.

At the resist-formation step of the inventive fabrication process, a resist pattern 21 having a plurality of openings 21a is first formed on the surface 20a of an electrically conductive support 20. Likewise, a resist pattern 22 having a plurality of openings 22a is formed on the back surface 20b of the electrically conductive support 20 (FIG. 5(A)). Each opening 21a in the resist pattern 21 is opposite to each opening 22a in the resist pattern 22 via the support substrate 20. Note here that the opening area of the opening 21a is smaller than that of the opening 22a.

The conductive support substrate 20 may be formed of austenite stainless, ferrite stainless or the like, for instance, SUS304, and SUS430, and has a thickness suitably selected from the range of 20 to 500 μm, preferably 30 to 300 μm.

For instance, the resist pattern 21, 22 may be formed by application of a material selected from positive, and negative photosensitive resist materials known so far in the art, and exposure and development of that material via a given mask. The shape and size of each opening 21a, 22a in the resist pattern 21, 22 determine the pores 3 in the porous support substrate 2 that forms a part of the inventive hydrogen-purification membrane 1, and they may be suitably set in consideration of the etching conditions at the etching step (described just below), the material and thickness of the support substrate 20, etc.

Then, at the etching step, the support substrate 20 is etched from both its surfaces using the above resist patterns 21 and 22 as masks, after which the resist patterns 21 and 22 are removed to obtain the porous support substrate 2 having a plurality of micropores 3 (FIG. 5(B)). Each pore 3 formed in the porous support substrate 2 in this way has a narrowest portion 3a therein, and satisfies relations represented by $1.0 \leq D1/T \leq 5.0$ and $1.0 \leq D2/T \leq 5.0$ where D1 is the opening diameter of each pore on the front surface side, D2 is the opening diameter of the pore on the back surface side and T is the thickness of the support substrate 20 as well as relations represented by $D3/D1 < 0.8$, $D3/D2 < 0.9$ or preferably $D3/D2 < 0.8$, and $D3 < 250$ μm where D3 is the opening diameter of the pore at the narrowest portion 3a. Furthermore, the total opening area of the pores on the front surface 2a side accounts for 20 to 80%, preferably 20 to 70% of the area of the support substrate 2.

The support substrate 20 may be etched in a spray, dip or other mode using an etching solution based on ferric chloride or the like, and removal of the resist patterns 21 and 22 may be done using an alkaline aqueous solution or the like.

Next, at the filling step, an insulating film 23 is applied onto the back surface 2b side of the porous support substrate 2, and a plating layer 24 is formed by electrolytic plating on the porous support substrate 2 from its front surface 2a side in such a way as to fill in the pores 3 (FIG. 5(C)).

For the insulating film 23, for instance, resin films such as polyethylene, polyethylene terephthalate, polypropylene, and polycarbonate films. The thickness of such an insulating film 23 may be suitably set in consideration of material, electrical insulation, film strength, etc., and may be on the order of about 30 to 300 μm as an example. Application of the insulating film 23 onto the porous support substrate 2 may be carried out using an adhesive based on polyamides, harnessing the heat fusion of the insulating film 23, or the like.

The plating layer 24, for instance, may be formed by means of electrolytic copper plating or electrolytic nickel plating where the porous support substrate 2 works as a feed layer, or the like. In the invention, there is the narrowest portion 3a in the pore 3, as described above, at which there is a high current density ensuring deposition upon plating. Thus, the plating material is connected to this position to fill up the narrowest portion 3a, and so the plating layer 24 embedded in the pore 3 makes voids less likely to occur or grow on the front surface 2a side outer from the narrowest portion 3a. Furthermore, as the embedding of the pore 3 by the plating layer 24 occurs from the surface on which the Pd alloy film 4 is formed at the later film-formation step (the surface 2a of the porous support substrate 2), it allows the Pd alloy film 4 to be formed with no difficulty, even when a void 24' occurs deep in the pore 3, as shown.

Then, at the film-formation step, the insulating film 23 is removed, and the plating layer 24 is polished in such a way as to expose the surface 2a of the porous support substrate 2 (FIG. 5(D)). Subsequently, a strike plating layer 25 is formed on the thus polished surface (surface 2a) (FIG. 6(A)), followed by formation of the Pd alloy film 4 on the strike plating layer 25 by electrolytic plating (FIG. 6(B)).

Removal of the insulting film 23 could be carried out by means of stripping or dissolution, and the polishing of the plating layer 24, for instance, could rely upon lapping, polishing, chemomechanical polishing (CMP), planar polishing, and buff polishing.

The strike plating layer 25 is formed for the purpose of improving adhesion to the Pd alloy film 4 by means of Ni striking plating, Au strike plating, Pd strike plating or other strike plating. The thickness of such a strike plating layer 25, for instance, could be set to the range of 0.01 to 0.5 μm.

The Pd alloy film 4, for instance, could be formed by a process wherein a Pd alloy film is directly provided by electrolytic plating, or a process wherein thin films of the individual components of a Pd alloy are stacked on the strike plating layer 25 by electrolytic plating or electroless plating, and heat treatment is then applied to the resulting stack to form a Pd alloy film by component diffusion. Typically, a Pd alloy could be obtained by forming a 3 μm-thick Pd by plating, forming a 1 μm-thick Ag on the Pd by plating, and applying heat treatment to the resulting combination at 500° C. for 24 hours. Alternatively, it is acceptable to carry out multilayer plating of Pd/Ag/Pd three layers, Pd/Ag/Pd/Ag four layers or the like, followed by heat treatment. The formed Pd alloy film 4 may have a thickness of about 0.5 to 30 μm, preferably about 1 to 15 μm.

The thus formed Pd alloy film 4 provides a defect-free film of uniform thickness, because even when there is a void 24' deep in the plating layer 24 filling in the pore 3, it would have no adverse influence on that film.

It is here noted that the Pd alloy film 4 may be directly provided without recourse to the above strike plating layer.

Finally, at the removal step, the plating layer 24 is removed by selective etching (FIG. 6(C)), after which the strike plating layer 25 is removed by selective etching to obtain the hydrogen-purification membrane 1 (FIG. 6(D)). Selective etching of the plating layer 24 could be carried out using an ammonia-based etching solution, and that of the striking plating 25 could be done using an etching solution based on sulfuric acid/hydrogen peroxide in the case of Ni strike plating. In either case, the etching could occur in a spray, dip, blow or other mode.

The thus fabricated hydrogen-purification membrane 1 has the Pd alloy film 4 fixed, with high strength, to the porous support substrate 2, and provides a membrane of much higher durability even when the Pd alloy film is slimmed down to enhance hydrogen permeation efficiency.

Figure 7:
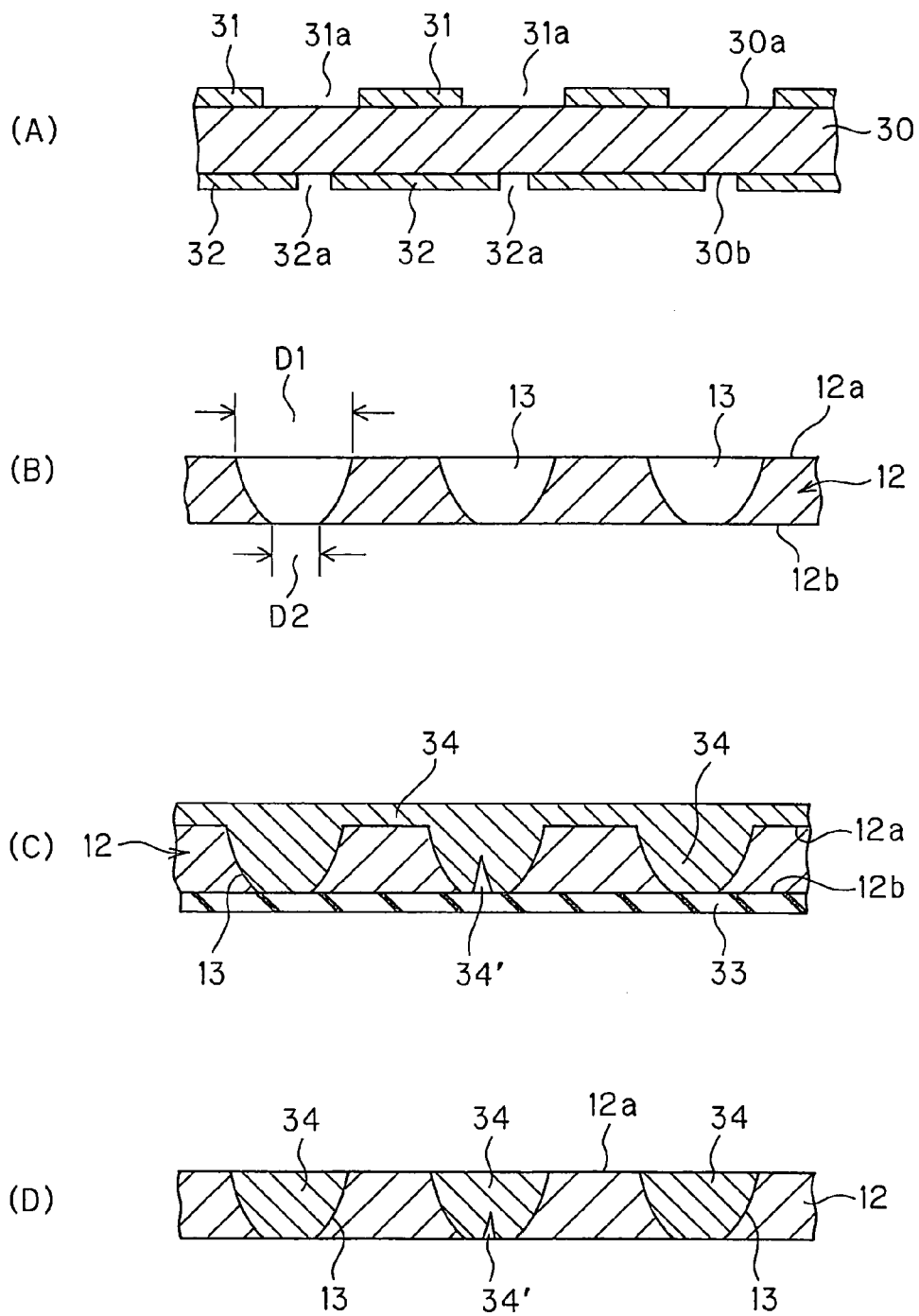
FIG. 7 is a step representation illustrative of another embodiment of the process of fabricating the hydrogen-purification membrane according to the invention.
Figure 8:
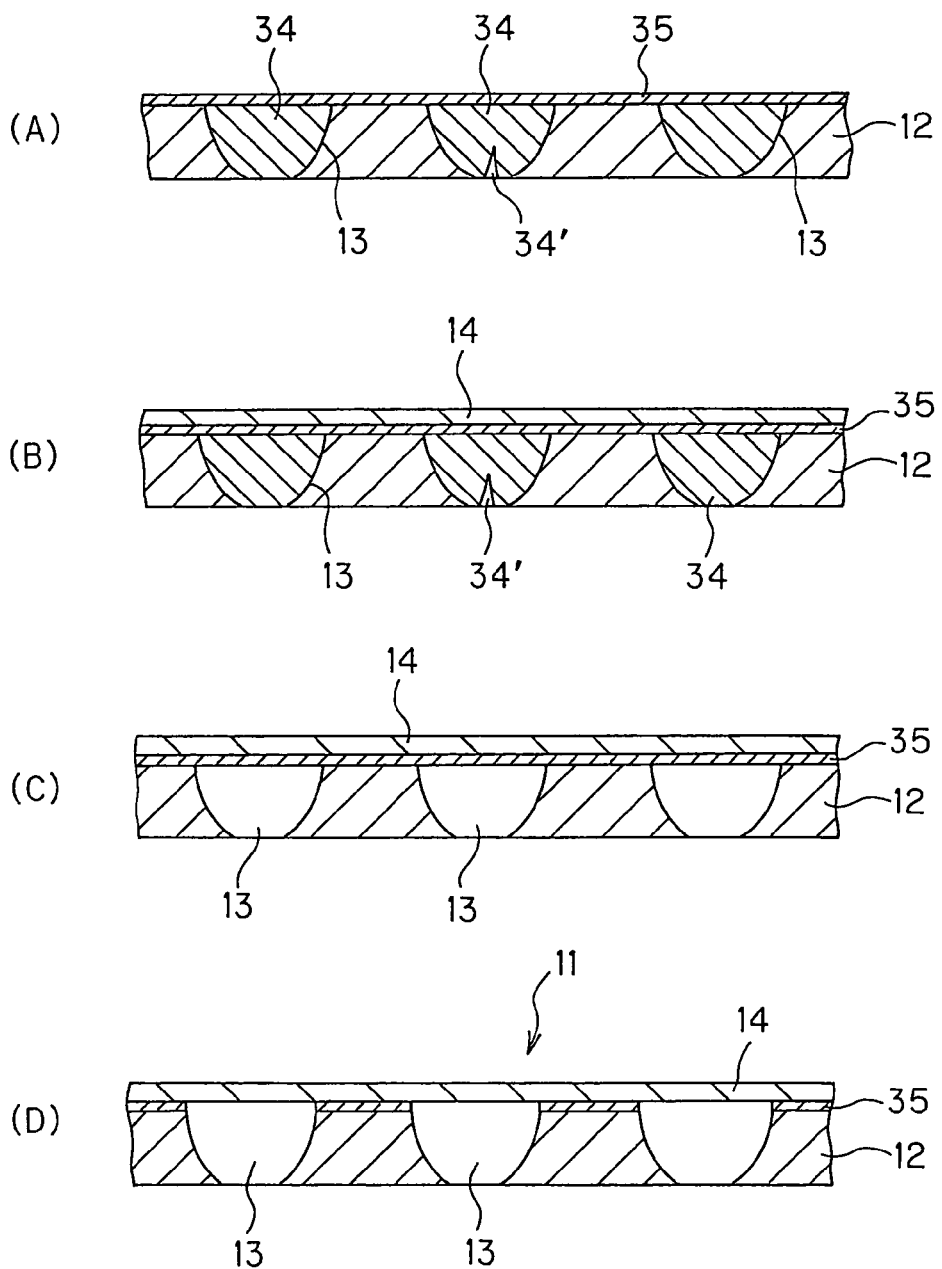
FIG. 8 is a step representation illustrative of another embodiment of the process of fabricating the hydrogen-purification membrane according to the invention.

FIGS. 7 and 8 are each illustrative of the steps of another embodiment of the hydrogen-purification membrane fabrication process according to the invention, wherein the above inventive hydrogen-purification membrane 11 is typically fabricated.

At the resist-formation step of the inventive fabrication process, a resist pattern 31 having a plurality of openings 31a is first formed on the surface 30a of an electrically conductive support 30, and a resist pattern 32 having a plurality of smaller openings 32a is formed on the back surface 30b of the electrically conductive support 30 (FIG. 7(A)). Each opening 31a in the resist pattern 31 is opposite to each opening 32a in the resist pattern 32 via the support substrate 30, and the opening area of the smaller opening 32a is smaller than that of the opening 31a.

The electrically conductive support substrate 30 may be formed of the same material as that of the above support substrate 20, and may have a thickness suitably selected from the range of 20 to 500 μm, preferably 50 to 300 μm. The resist patterns 31 and 32 may be formed as is the case with the above resist patterns 21 and 22. The shape and size of the openings 31a in the resist pattern 31, and the smaller openings 32a in the resist pattern 32 determine pores 13 in the porous support substrate 12 that forms a part of the inventive hydrogen-purification membrane 11, and may be aptly set in consideration of the etching conditions at the etching step (described just below), the material and thickness of the support substrate 30, etc. Note here that the resist pattern 32 may be free of smaller openings 32a all over the surface (or covered all over the back surface 30b of the support substrate 30).

Then, at the etching step, the support substrate 30 is etched from its front and back surfaces using the above resist patterns 31 and 32 as masks, after which the resist patterns 31 and 32 are removed to form the porous support substrate 12 having a plurality of pores 13 (FIG. 7(B)). Each pore 13 formed in the support substrate 12 satisfies relations represented by $1.5 \leq D1/T \leq 5.0$ and $0.2 \leq D2/D1 \leq 0.8$ where D1 is the opening diameter of the pore on the front surface side, D2 is the opening diameter of the pore on the back surface side and T is the thickness of the support substrate 30, and the total opening area of the pores on the front surface 30a side accounts for 20 to 80%, preferably 30 to 80% of the area of the support substrate 30.

Etching of the support substrate 30 and removal of the resist patterns 31 and 32 may be carried out, following the above embodiment. Note here that when the resist pattern 32 is free of smaller openings 32a all over the surface, etching is carried out from the surface 30a of the support substrate 30 using the above resist patterns 31 and 32 as masks.

Then, at the filling step, an insulting film 33 is applied to the back surface 12b side of the porous support substrate 12, and a plating layer 34 is formed by electrolytic plating on the porous support substrate 12 from its surface 12a side in such a way as to fill in the pores 13 (FIG. 7(C)).

The material and thickness of the insulating film 33 and application of the insulating film 33 may be the same as in the above embodiment.

The plating layer 34, for instance, may be carried out by electrolytic copper plating or electrolytic nickel plating wherein the porous support substrate 12 works as a feed layer, or the like. With the invention wherein the embedding of the pore 13 by the plating layer 34 occurs from the surface on which the Pd alloy film 14 is formed at the later film-formation step (the surface 12a of the porous support substrate 12), even though a void 34' occurs deep in the pore 13, it would offer no obstacle to the formation of the Pd alloy film 14.

Then, at the film-formation step, the insulating film 33 is removed, the plating layer 34 is polished in such a way as to expose the surface 12a of the porous support substrate 12 (FIG. 7(D)), and a strike plating layer 35 is formed on the side of that polished surface (the surface 12a) (FIG. 8(A)). Subsequently, the Pd alloy film 14 is formed by plating on the strike plating layer 35 (FIG. 8(B)).

Removal of the insulating film 33, the polishing of the plating layer 34 and the formation of the strike plating layer 35 may be carried out following removal of the insulating layer 23, the polishing of the plating layer 24 and the formation of the strike plating layer 25 in the above embodiment.

The formation of the Pd alloy film 14 may also be carried out by the same process as that for forming the Pd alloy film 4 in the above embodiment. The formed Pd alloy film 14 provides a defect-free film of uniform thickness, because even when there is a void 34' deep in the plating layer 34 filling in the pore 13, it would have no adverse influence thereon.

Note here that the Pd alloy film 4 may be directly provided without recourse to the above strike plating layer 35.

Finally, at the removal step, the plating layer 34 is removed by selective etching (FIG. 8(C)), and the strike plating layer 35 is thereafter removed by selective etching, thereby obtaining the hydrogen-purification membrane 11 (FIG. 8(D)). Selective etching of the plating layer 34 and the strike plating layer 35 may be carried out, following selective etching of the plating layer 24 and the strike plating layer 25 in the above embodiment.

The thus fabricated hydrogen-purification membrane 11 has the Pd alloy film 14 fixed, with high strength, to the porous support substrate 12, and provides a membrane of much higher durability even when the Pd alloy film is slimmed down to enhance hydrogen permeation efficiency.

With such an inventive fabrication process as described above, the Pd alloy film is unlikely to break down, because the pores 3, 13 have already been formed in the support substrate 20, 30 prior to the formation of the Pd alloy film 4, 14 thereon. In addition, it is unnecessary to provide any porous metal film on the Pd alloy film 4, 14. This in turn would enable fabrication times to be cut down and resist removal at the final step to be dispensed with, resulting in improvements in fabrication efficiency.

At the film-formation step of the above inventive fabrication process, the strike plating layer 25, 35 is provided and the Pd alloy film 4, 14 is then provided via that strike plating layer 25, 35. Note, however, that the Pd alloy film may be provided via a diffusion-preventive layer in place of the strike plating layer for the purpose of preventing mutual diffusion between the porous support substrate and the Pd alloy film. The diffusion-preventive layer, for instance, could be formed of a thin film comprising any one of titanium nitride, titanium carbide, titanium oxide, silicon nitride, silicon carbide, silicon oxide, aluminum nitride, aluminum oxide, magnesium oxide, and so on. Such a diffusion-preventive layer could be provided by means of any one of electrolytic plating, electroless plating, ion plating, sputtering, etc., with a thickness selected from the range of, for instance, 0.1 to 0.5 µm. Note here that the diffusion-preventive layer formed at the film-formation step may be removed by selective etching at the removal step.

The invention is now explained in further details with reference to more specific examples.

EXAMPLE 1

A SUS304 material with a thickness (T) of 50 µm was used as the electrically conductive support substrate, and a photosensitive resist material (OFPR made by Tokyo Ohka Kogyo Co., Ltd.) was coated on both surfaces of the SUS304 material by means of dipping (at a coating amount of 7 µm as measured on a dry basis). Then, a photomask A having a plurality of circular openings, each having an opening size (diameter) of 30 µm, at a pitch of 120 µm was placed on one of the above resist coating films while, at the same time, a photomask B having a plurality of circular openings, each having an opening size (diameter) of 55 µm, at a pitch of 120 µm was placed on the other resist coating film. Via those photomasks A and B, the resist coating films were exposed to light, and then developed using sodium hydrogencarbonate. Here, the center of each opening in the photomask A was in alignment with the center of each opening in the photomask B with the SUS304 material placed between them.

In this way, a resist pattern having circular openings, each with an opening size (diameter) of 30 µm, was formed on one surface of the SUS304 material, and a resist pattern having circular openings, each with an opening size (diameter) of 55 µm, was formed on the other surface (back surface side) of the SUS304 material. The center of each opening formed on one surface of the SUS304 material was in alignment with the center of each opening on the other or opposite surface with the SUS 304 material placed between them. This is the resist-formation step.

Using the above resist patterns as masks, the SUS304 material was then etched from both its sides in a spray mode under the following conditions.

Etching Conditions
 Temperature: 50° C.
 Ferric Chloride Concentration: 45 Baumé
 Pressure: 0.30 MPa After the completion of the etching treatment, the resist patterns were taken off using sodium hydroxide, followed by water washing of the SUS304 material. Pores were thus formed in the SUS304 material, yielding a porous support substrate. Each pore was of a circular shape having a narrowest portion inside, wherein the front surface side-opening diameter $D1$ was 61 µm (opening diameter $D1$/porous support thickness $T=1.2$), the back surface side-opening diameter $D2$ was 85 µm (opening diameter $D2$/porous support thickness $T=1.7$) and the narrowest portion's opening diameter $D3$ was 45 µm (opening diameter $D3$/opening diameter $D1=0.73$ and opening diameter $D3$/opening diameter $D2=0.53$). The opening area ratio of the openings on the front surface side of the porous support substrate was 20%. Thus, each of the formed pores was found to satisfy relations represented by $1.0 \leq D1/T \leq 5.0$ and $1.0 \leq D2/T \leq 5.0$ where $D1$ is the opening diameter, $D2$ is the opening diameter and $T$ is the porous support thickness) as well as relations represented by $D3/D1<0.8$ and $D3/D2<0.9$ where $D1$ is the opening diameter, $D2$ is the opening diameter of the narrowest portion, and the total opening area of the pores on the side joined to the Pd alloy film was found to come within the range of 20 to 80% of the area of the porous support substrate. This is the etching step.

Then, a 200 µm-thick insulating film was applied onto the back surface of the SUS304 material. Subsequently, electrolytic copper plating was applied under the following conditions to the surface of the SUS304 material, onto which no insulating film was applied, thereby filling the pores with a copper plating layer and forming a copper plating layer (having a thickness of about 60 µm) on the front surface of the SUS304 material. This is the filling step.

Copper Plating Conditions
 Plating Bath: copper sulfate bath
 Bath Temperature: 30° C.
 Current Density: 1 A/dm$^2$ Then, the insulating film was peeled off the SUS304 material, after which the copper plating layer was polished by lapping in such a way as to expose the surface of the SUS304 material.

Then, the SUS304 material was subjected to electrolytic plating from the polished surface side under the following conditions, thereby forming a Ni strike plating layer (having a thickness of 0.2 µm) thereon.

Ni Strike Plating Conditions
 Plating Bath: nickel chloride bath
 Bath Temperature: 55° C.
 Current Density: 10 A/dm$^2$ Then, a Pd alloy film (having a thickness of 5 µm) was formed on the Ni strike plating layer by electrolytic plating under the following conditions. This is the film-formation step.

Film-Formation Conditions for the Pd Alloy Film
 Plating Bath Pd chloride plating bath (at a Pd concentration of 12 g/L)
 pH: 7 to 8
 Current Density: 1 A/dm$^2$
 Bath Temperature: 40° C.

Then, the copper plating layer was selectively etched off using a selective etching solution based on ammonium persulfate, after which the Ni strike plating layer was selectively etched off using a Ni selective etching solution based on sulfuric acid/hydrogen peroxide. This is the removal step.

After the completion of the removal step, the SUS304 material was cut into a hydrogen-purification membrane sized to 3 cm×3 cm.

With the thus fabricated hydrogen-purification membrane attached to a reformer, a methanol/steam mixture was fed to the Pd alloy film continuously over a period of 100 hours under high temperature and pressure conditions (300° C., 0.50 MPa) to measure the CO concentration of hydrogen-rich gas permeating onto the porous support substrate side of the hydrogen-purification membrane and the flow rate of the hydrogen-rich gas. As a result, in the period from just after reformation up to the lapse of 300 hours, the CO concentration was found to be as low as 5 to 10 ppm and the flow rate of the hydrogen-rich gas was found to be 1 L/min., indicating that the inventive hydrogen-purification membrane has improved durability and hydrogen permeation efficiency.

EXAMPLE 2

A SUS304 material with a thickness (T) of 50 μm was used as the electrically conductive support substrate, and a photosensitive resist material (OFPR made by Tokyo Ohka Kogyo Co., Ltd.) was coated on both surfaces of the SUS304 material by means of dipping (at a coating amount of 7 μm as measured on a dry basis). Then, a photomask C having a plurality of circular openings, each having an opening size (diameter) of 65 μm, at a pitch of 150 μm was placed on one of the above resist coating films while, at the same time, a photomask D having a plurality of circular smaller openings, each having an opening size (diameter) of 30 μm, at a pitch of 150 μm was placed on the other resist coating film. Via those photomasks C and D, the resist coating films were exposed to light, and then developed using sodium hydrogencarbonate. Here, the center of each opening in the photomask C was in alignment with the center of each opening in the photomask D with the SUS304 material placed between them.

In this way, a resist pattern having circular openings, each with an opening size (diameter) of 65 μm, was formed on one surface (on the front surface side) of the SUS304 material, and a resist pattern having circular smaller openings, each with an opening size (diameter) of 30 μm, was formed on the other surface (back surface side) of the SUS304 material. The center of each opening formed on one surface of the SUS304 material was in alignment with the center of each opening on the other or opposite surface with the SUS 304 material placed between them. This is the resist-formation step.

Using the above resist patterns as masks, the SUS304 material were then etched from both its sides in a spray mode under the following conditions.

Etching Conditions
Temperature: 50° C.
Ferric Chloride Concentration: 45 Baumé
Pressure: 0.30 MPa After the completion of the etching treatment, the resist patterns were taken off using sodium hydroxide, followed by water washing of the SUS304 material. Pores were thus formed in the SUS304 material, yielding a porous support substrate. Each pore had no narrowest portion inside but had a narrowest opening portion on the back surface side, wherein the front surface side-opening diameter D1 was 110 μm (opening diameter D1/porous support thickness T=2.2), and the back surface side-opening diameter D2 was 50 μm (opening diameter D2/opening diameter D1=0.45). The opening area ratio of the openings on the front surface side of the porous support substrate was 42%. Thus, each of the formed pores was found to satisfy relations represented by $1.5 \leq D1/T \leq 5.0$ and $0.2 \leq D2/D1 \leq 0.8$ where D1 is the opening diameter, D2 is the opening diameter and T is the porous support thickness), and the total opening area of the pores on the side joined to the Pd alloy film was found to come within the range of 30 to 90% the area of the porous support substrate. This is the etching step.

Then, a 200 μm-thick insulating film was applied onto the back surface of the SUS304 material. Subsequently, electrolytic copper plating was applied under the same conditions as in Example 1 to the surface of the SUS304 material, onto which no insulating film was stuck, thereby filling the pores with a copper plating layer and forming a copper plating layer (having a thickness of about 80 μm) on the front surface of the SUS304 material. This is the filling step.

Then, the insulating film was peeled off the SUS304 material, after which the copper plating layer was polished as in Example 1 in such a way as to expose the surface of the SUS304 material.

Then, the SUS304 material was subjected to electrolytic plating from the polished surface side under the same conditions as in Example 1, thereby forming a Ni strike plating layer (having a thickness of 0.2 μm) thereon.

Then, a Pd alloy film (having a thickness of 5 μm) was formed on the Ni strike plating layer by electrolytic plating under the same conditions as in Example 1. This is the film-formation step.

Then, the copper plating layer and the Ni strike plating layer were selectively etched off, following Example 1. This is the removal step.

After the completion of the removal step, the SUS304 material was cut into a hydrogen-purification membrane sized to 3 cm×3 cm.

With the thus fabricated hydrogen-purification membrane attached to a reformer, a methanol/steam mixture was fed to the Pd alloy film continuously over a period of 100 hours under high temperature and pressure conditions (300° C., 0.3 MPa) to measure the CO concentration of hydrogen-rich gas permeating onto the porous support substrate side of the hydrogen-purification membrane and the flow rate of the hydrogen-rich gas. As a result, in the period from just after reformation up to the lapse of 300 hours, the CO concentration was found to be as low as 5 to 10 ppm and the flow rate of the hydrogen-rich gas was found to be 1 L/min., indicating that the inventive hydrogen-purification membrane has improved durability and hydrogen permeation efficiency.

COMPARATIVE EXAMPLE

Following Example 1, a porous support substrate (the porous support substrate 42 depicted in FIG. 9) having no narrowest portion in each pore but having pores, each configured to have a front surface side-opening smaller than a back surface side-opening, was prepared except changes in the size of openings in the resist patterns formed at the resist-formation step. Specifically, the thickness T of the porous support substrate 42 was 50 μm, the opening diameter D1 of each pore 43 on the front surface side was 50 μm, the opening diameter D2 of the pore on the back surface side was 143 μm, and the pore pitch was 120 μm. In other words, the ratio T/D1 between the thickness T of the porous support substrate 42 and the opening diameter D1 was 1.0, the ratio D2/D1 between the opening diameter D2 and the opening diameter D1 was 2.86, and the area ratio of the openings on the surface of the porous support substrate 42 was 14%.

Figure 9:
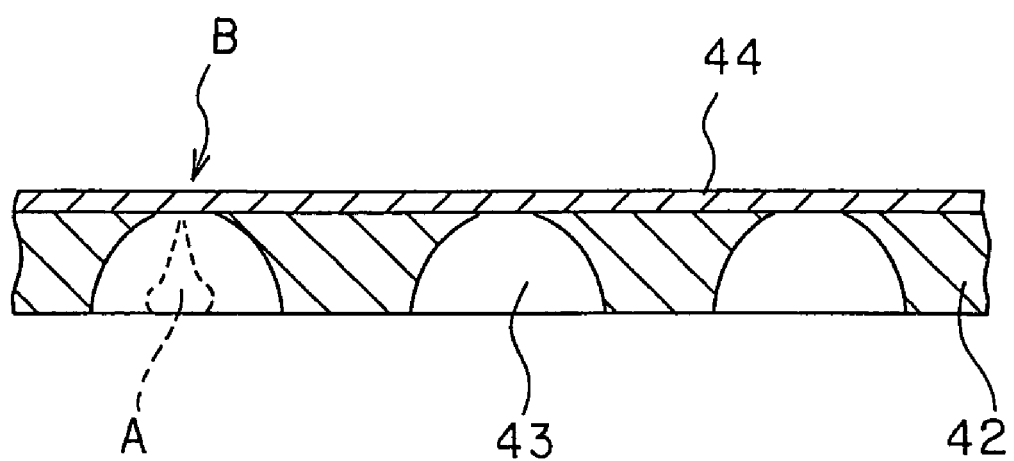
FIG. 9 is illustrative of a comparative hydrogen-purification membrane example.

Then, the Pd alloy film 44 was joined to the porous support substrate 42 as in Example 1 into an integral combination, which was cut to a 3 cm×3 cm size, thereby obtaining such a hydrogen-purification membrane (comparative example) as depicted in FIG. 9.

Observation with transmitted light of the Pd alloy film 44 of the thus fabricated hydrogen-purification membrane under a stereomicroscope indicated that out of 100 hydrogen-purification membrane samples, 40 had a defective Pd alloy film 44. That is, there were voids with no copper plating filled in the pores 43 (the void shape upon filling with plating is shown at A in FIG. 9), and most of void sites became pinhole-inducing positions in the Pd alloy film 44 (shown at B in FIG. 9).

Hydrogen-purification membranes with no defects in the Pd alloy film were picked out for attachment to reformers. Under the same high temperature and pressure conditions as in Example 1, a methanol/steam mixture was fed to the Pd alloy film of each membrane to measure the CO concentration of hydrogen-rich gas permeating onto the porous support substrate side of the membrane and the flow rate of the hydrogen-rich gas. As a result, in the period from just after reformation up to the lapse of 100 hours, the CO concentration was kept at a good level of as low as 5 to 10 ppm; however, the flow rate of the hydrogen-rich gas was barely 0.6 L/min., indicative of unsatisfactory hydrogen permeation efficiency.

Hydrogen-purification membranes with no defects in the Pd alloy film were likewise picked out for attachment to reformers. Under the same high temperature and pressure conditions as in Example 2 this time, a methanol/steam mixture was fed to the Pd alloy film of each membrane to measure the CO concentration of hydrogen-rich gas permeating onto the porous support substrate side of the membrane and the flow rate of the hydrogen-rich gas. As a result, in the period from just after reformation up to the lapse of 100 hours, the CO concentration was kept at a good level of as low as 5 to 10 ppm; however, the flow rate of the hydrogen-rich gas was barely 0.3 L/min., indicative of unsatisfactory hydrogen permeation efficiency.

POSSIBLE INDUSTRIAL APPLICATIONS

The invention could find applications in various fields for which hydrogen-rich gases of high purities are needed.

What we claim is:

1. A high-pressure hydrogen-purification membrane for hydrogen permeation at a pressure of 0.40 MPa or more, said membrane comprising a porous support substrate having a plurality of pores and a Pd alloy film joined to one surface of said porous support substrate, wherein:
    said membrane is configured to allow for permeation of hydrogen comprised in a reformed gas at a pressure of 0.40 MPa or more,
    each pore in said porous support substrate is configured to have a narrowest portion therein,
    between a thickness T of said porous support substrate, an opening diameter D1 of each pore on a side joined to said Pd alloy film and an opening diameter D2 of the pore on an opposite side, there are relations represented by $1.0 \leq D1/T \leq 5.0$ and $1.0 \leq D2/T \leq 5.0$,
    between the opening diameter D1 of the pore on the side joined to said Pd alloy film, the opening diameter D2 of the pore on the opposite side and an opening diameter D3 of the narrowest portion of the pore, there are relations represented by $D3/D1<0.8$, $D3/D2<0.9$ and $D3<250$ μm, and
    a total opening area of the pores on the side joined to said Pd alloy film accounts for 20 to 80% of an area of said porous support substrate.

2. A hydrogen-purification membrane according to claim 1, wherein said porous support substrate has a thickness ranging from 20 to 500 μm, and said Pd alloy film has a thickness ranging from 0.5 to 30 μm.

3. A low-pressure hydrogen-purification membrane for hydrogen permeation at a pressure of 0.40 MPa or less, said membrane comprising a porous support substrate having a plurality of pores and a Pd alloy film joined to one surface of said porous support substrate, wherein:
    said membrane is configured to allow for permeation of hydrogen comprised in a reformed gas at a pressure of 0.40 MPa or less,
    between a thickness T of said porous support substrate, an opening diameter D1 of each pore on a side joined to said Pd alloy film and an opening diameter D2 of the pore on an opposite side, there are relations represented by $1.5 \leq D1/T \leq 5.0$ and $0.2 D2/D1 \leq 0.8$, and
    a total opening area of the pores on the side joined to said Pd alloy film accounts for 30 to 90% of an area of said porous support substrate.

4. A hydrogen-purification membrane according to claim 3, wherein said porous support substrate has a thickness ranging from 20 to 500 μm, and said Pd alloy film has a thickness ranging from 0.5 to 30 μm.

5. A fabrication process of a high-pressure hydrogen-purification membrane for hydrogen permeation at a pressure of 0.40 MPa or more, comprising:
    a resist-formation step of forming a resist pattern having a plurality of openings on a front surface of an electrically conductive support substrate, and forming on a back surface of said support substrate a resist pattern having a plurality of openings in alignment with the openings in the first resist pattern,
    an etching step of etching said support substrate from front and back sides thereof using said resist patterns as masks to make a porous support substrate having a plurality of pores, wherein each pore has a narrowest portion therein; $1.0 \leq D1/T \leq 5.0$ and $1.0 \leq D2/T \leq 5.0$ are satisfied with respect to relations of an opening diameter D1 of the pore on a front surface side and an opening diameter D2 of the pore on a back surface side to a thickness T of said support substrate; $D3/D1<0.8$, $D3/D2<0.9$ and $D3<250$ μm are satisfied with respect to relations of an opening diameter D3 of said narrowest portion to said opening diameters D1 and D2; and a total area of the openings on the front surface side accounts for 20 to 80% of an area of said porous support substrate,
    a filling step of applying an insulating film onto the back surface side of said support substrate, and forming a plating layer on said porous support substrate from the front surface side thereof by electrolytic plating in such a way as to fill in said pores,
    a film-formation step of removing said insulating film, polishing said plating layer in such a way as to expose the front surface of said porous support substrate, and forming a Pd alloy film on the thus polished surface side by plating, and
    a removal step of removing said plating layer from the back surface side of said porous support substrate by means of selective etching.

6. A hydrogen-purification membrane fabrication process according to claim 5, wherein at said film-formation step, the Pd alloy film is formed by electrolytic plating.

7. A hydrogen-purification membrane fabrication process according to claim 5, wherein at said film-formation step, thin films of individual components that form the Pd alloy film are first stacked by plating, and heat treatment is then applied to a stack to form the Pd alloy film by component diffusion.

8. A hydrogen-purification membrane fabrication process according to claim 5, wherein at said film-formation step, a strike plating layer is formed on said polished surface side, and the Pd alloy film is then formed, while said strike plating layer is removed by selective etching at said removal step.

9. A hydrogen-purification membrane fabrication process according to claim 5, wherein at said film-formation step, a strike plating layer is formed on said polished surface side, and the Pd alloy film is then formed, while heat treatment is applied to said strike plating layer for component diffusion into the Pd alloy film.

10. A hydrogen-purification membrane fabrication process according to claim 5, wherein at said film-formation step, a diffusion-preventive layer is formed on said polished surface side by electrolytic plating or electroless plating, and the Pd alloy film is then formed, while said diffusion-preventive layer is removed by selective etching at said removal step.

11. A fabrication process of a low-pressure hydrogen-purification membrane for hydrogen permeation at a pressure of 0.40 MPa or less, comprising:

a resist-formation step of forming a resist pattern having a plurality of openings on a front surface of an electrically conductive support substrate, and forming on a back surface of said support substrate a resist pattern having a plurality of smaller openings in alignment with the openings in the first resist pattern and with a smaller area than that of the first openings or having no such smaller openings, an etching step of etching said support substrate from the front and back surfaces or the front surface thereof using said resist patterns as masks to make a porous support substrate having a plurality of pores wherein $1.5 \leq D1/T \leq 5.0$ and $0.2 \leq D2/D1 \leq 0.8$ are satisfied with respect to relations of an opening diameter $D1$ on the front surface side and an opening diameter $D2$ on the back surface side to a thickness $T$ of said support substrate; and a total area of the openings on the front surface side accounts for 20 to 80% of an area of said porous support substrate, a filling step of applying an insulating film onto the back surface side of said support substrate, and forming a plating layer on said porous support substrate from the front surface side thereof by electrolytic plating in such a way as to fill in said pores, a film-formation step of removing said insulating film, polishing said plating layer in such a way as to expose the front surface of said porous support substrate, and forming a Pd alloy film on the thus polished surface side by plating, and a removal step of removing said plating layer from the back surface side of said porous support substrate by means of selective etching.

12. A hydrogen-purification membrane fabrication process according to claim 11, wherein at said film-formation step, the Pd alloy film is formed by electrolytic plating.

13. A hydrogen-purification membrane fabrication process according to claim 11, wherein at said film-formation step, thin films of individual components that form the Pd alloy film are first stacked by plating, and heat treatment is then applied to a stack to form the Pd alloy film by component diffusion.

14. A hydrogen-purification membrane fabrication process according to claim 11, wherein at said film-formation step, a strike plating layer is formed on said polished surface side, and the Pd alloy film is then formed, while said strike plating layer is removed by selective etching at said removal step.

15. A hydrogen-purification membrane fabrication process according to claim 11, wherein at said film-formation step, a strike plating layer is formed on said polished surface side, and the Pd alloy film is then formed, while heat treatment is applied to said strike plating layer for component diffusion into the Pd alloy film.

16. A hydrogen-purification membrane fabrication process according to claim 11, wherein at said film-formation step, a diffusion-preventive layer is formed on said polished surface side by electrolytic plating or electroless plating, and the Pd alloy film is then formed, while said diffusion-preventive layer is removed by selective etching at said removal step.

* * * * *